(12) United States Patent
Furuya

(10) Patent No.: US 10,466,566 B2
(45) Date of Patent: Nov. 5, 2019

(54) OPTICAL TRANSMISSION APPARATUS, SEMICONDUCTOR INTEGRATED DRIVING DEVICE

(71) Applicant: SUMITOMO ELECTRIC INDUSTRIES, LTD., Osaka (JP)

(72) Inventor: Akira Furuya, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/864,666

(22) Filed: Jan. 8, 2018

(65) Prior Publication Data

US 2018/0196328 A1 Jul. 12, 2018

(30) Foreign Application Priority Data

Jan. 11, 2017 (JP) ................................ 2017-002778

(51) Int. Cl.
*G02F 1/225* (2006.01)
*H04B 10/54* (2013.01)
*G02F 1/21* (2006.01)
*H04B 10/516* (2013.01)

(52) U.S. Cl.
CPC ........... *G02F 1/225* (2013.01); *H04B 10/541* (2013.01); *G02F 2001/212* (2013.01); *G02F 2201/12* (2013.01); *H04B 10/5161* (2013.01)

(58) Field of Classification Search
CPC ............... G02F 1/225; G02F 2001/212; G02F 2201/12; H04B 10/5161; H04B 10/541
See application file for complete search history.

(56) References Cited

FOREIGN PATENT DOCUMENTS

| JP | 2010-507131 | 3/2010 |
|---|---|---|
| WO | 2008/051429 | 5/2008 |

OTHER PUBLICATIONS

Simard et al., Segmented silicon MZM for PAM-8 transmissions at 114 Gb/s with binary signaling, Optics Express, V. 24, N. 17, 2016 (Year: 2016).*
Stojanovic et al., Timing Recovery in High-Speed PAM-4 Transmission Systems, 24th Telecommunications forum TELFOR 2016 (Year: 2016).*
Mathieu Chagnon et al., "Experimental Parametric Study of a Silicon Photonic Modulator Enabled 112-Gb/s PAM Transmission System With a DAC and ADC", *Journal of Lightwave Technology*, vol. 33, No. 7, Apr. 1. 2015, p. 1380-p. 1387.

* cited by examiner

*Primary Examiner* — Peter Radkowski
(74) *Attorney, Agent, or Firm* — Smith, Gambrell & Russell, LLP.

(57) ABSTRACT

An optical transmission apparatus includes: a Mach-Zehnder modulator including a first arm waveguide having electrodes; and a driver driving the Mach-Zehnder modulator in response to a pulse amplitude modulated signal, the driver including driving circuits connected to the respective electrodes and each of the driving circuits including a comparator receiving the pulse amplitude modulated signal.

33 Claims, 12 Drawing Sheets

OPTICAL TRANSMISSION APPARATUS, SEMICONDUCTOR INTEGRATED DRIVING DEVICE

BACKGROUND OF THE INVENTION

Field of the Invention

The present invention relates to an optical transmission apparatus and a semiconductor integrated driving device. This application claims the benefit of priority from Japanese Patent application No. 2017-002778 filed on Jan. 11, 2017, which is herein incorporated by reference in its entirety.

Related Background Art

Japanese Unexamined Patent Application Publication (Translation of PCT Application) No. 2010-507131 Patent Document 1 (which is referred to as "Patent Document 1") discloses a Mach-Zehnder optical modulator that outputs a PAM optical signal. Mathieu Chagnon et. al., "Experimental Parametric Study of a Silicon Photonic Modulator Enabled 112-Gb/s PAM Transmission System With a DAC and ADC", JOURNAL OF LIGHTWAVE TECHNOLOGY, Apr. 1, 2015, pp. 1380-1387 (which is referred to as "Non-Patent Document 1") discloses a Mach-Zehnder optical modulator that outputs a PAM optical signal.

SUMMARY OF THE INVENTION

An optical transmission apparatus according to one aspect of the present invention includes: a Mach-Zehnder modulator including a first arm waveguide having electrodes; and a driver driving the Mach-Zehnder modulator in response to a pulse amplitude modulated signal, the driver including driving circuits connected to the respective electrodes and each of the driving circuits including a comparator receiving the pulse amplitude modulated signal.

An optical transmission apparatus according to one aspect of the present invention includes: a Mach-Zehnder modulator including an arm waveguide with a plurality of electrodes; and a semiconductor integrated driving device having an input configured to receive an pulse amplitude modulated signal having amplitude levels indicating respective symbols, and a plurality of outputs configured to supply a plurality of drive signals to the Mach-Zehnder modulator, the plurality of drive signals being associated with respective amplitudes of the pulse amplitude modulated signal such that one or more of the electrodes causes phase change of light propagating in the arm waveguide; and a plurality of conductors connecting the plurality of electrodes of the arm waveguide with the semiconductor integrated driving device, the semiconductor integrated driving device including a plurality of limiting amplifiers driving the plurality of electrodes, and the plurality of limiting amplifiers being connected to the Mach-Zehnder modulator through the plurality of conductors.

A semiconductor integrated driving device according to another aspect of the present invention includes: an input configured to receive a pulse amplitude modulated signal having amplitude levels indicating respective symbols on an optical signal to be produced by a Mach-Zehnder modulator having a plurality of modulation electrodes; a plurality of driving circuits connected to the input and generating a plurality of drive signals; and a plurality of outputs connected to the plurality of driving circuits and configured to supply the plurality of drive signals to the plurality of modulation electrodes of the Mach-Zehnder modulator, the plurality of driving circuits including a plurality of comparators receiving the pulse amplitude modulated signal from the input.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

DESCRIPTION OF THE EMBODIMENTS

Figure 1:
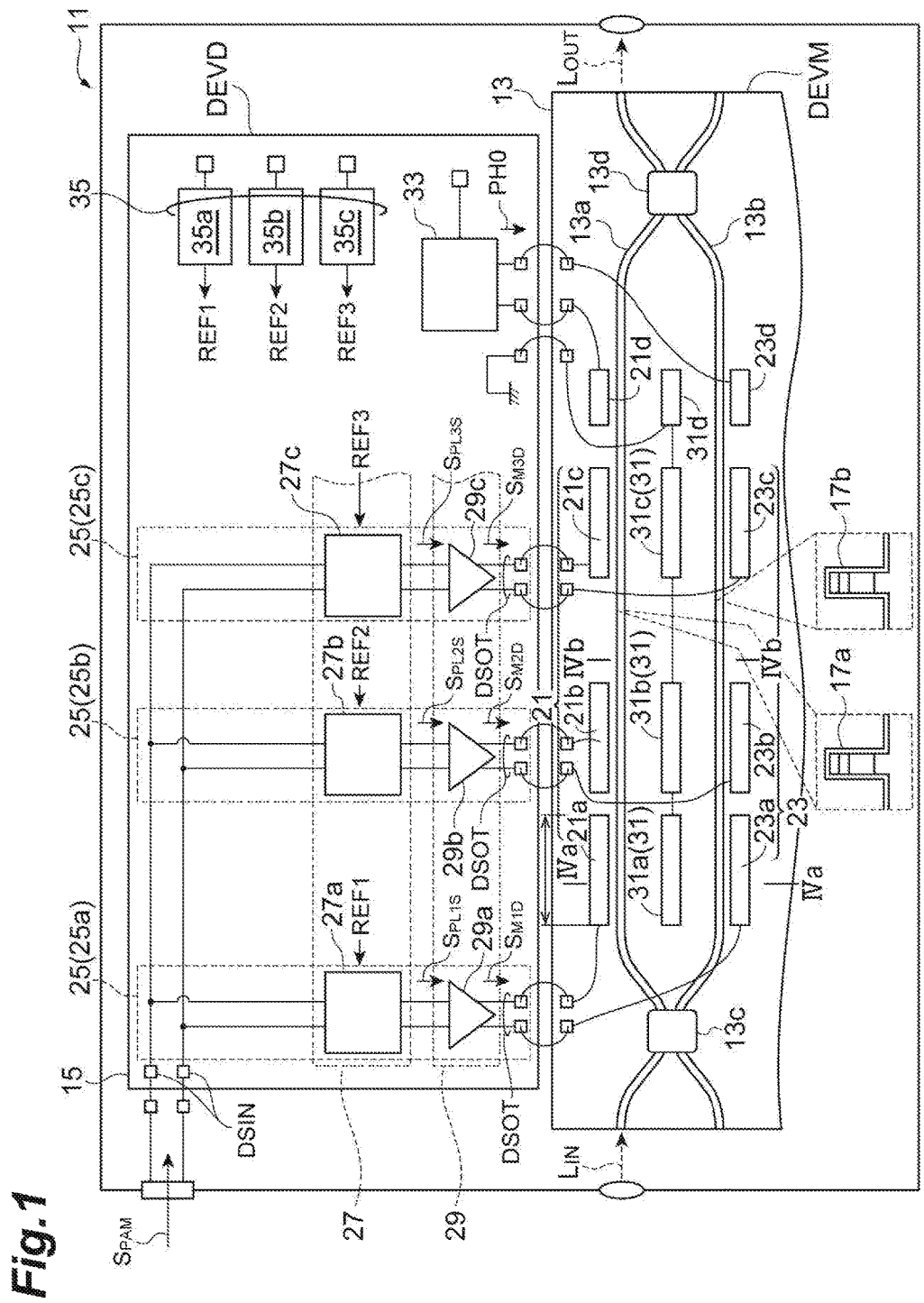
FIG. 1 is a schematic view showing an optical transmission apparatus according to the present embodiment.

Patent Document 1 does not disclose a circuit for driving a Mach-Zehnder optical modulator. Non-patent document 1 discloses a driving manner that enables a Mach-Zehnder optical modulator to generates PAM optical output signals the intensity of which substantially linearly changes with the phase of light in the arm waveguide thereof. Specifically, Non-Patent Document 1 discloses a linear amplifier that drives a Mach-Zehnder optical modulator. In order to enable the driving within a linear region which allows the intensity of the optical output linearly varies with the phase difference, the linear amplifier requires a PAM electrical signal the amplitude of which is limited to the linear region.

What is needed is to eliminate the restriction in amplitude in Non-Patent Document 1 and to teach a novel driving manner to drive the Mach-Zehnder modulator in Patent Document 1 in.

It is an object of one aspect of the present invention to provide an optical transmission apparatus that produces a PAM optical signal from a PAM electrical signal. It is an object of another aspect of the present invention to provide a driving integrated semiconductor device that can drive a Mach-Zehnder optical modulator in response to a PAM electrical signal.

Specific embodiments according to the present above aspects will be described below.

An optical transmission apparatus according to an embodiment includes: (a) a Mach-Zehnder modulator including a first arm waveguide having multiple electrodes; and (b) a driver driving the Mach-Zehnder modulator in response to a pulse amplitude modulated signal, the driver including driving circuits connected to the respective electrodes and each of the driving circuits including a comparator receiving the pulse amplitude modulated signal.

The optical transmission apparatus provides each of the driving circuits with a comparator that generates an electric pulse signal from a PAM signal (which is a common electric signal having multiple voltage levels). The electric pulse signals from the driving circuits for the first arm waveguide each define a time period in which a certain modulation electrode of the modulation electrodes, which are located on the first arm waveguide, is effective in changing the phase of light propagating the first arm waveguide. The Mach-Zehnder modulator allows the modulation electrodes on the first arm waveguide to receive the electric pulse signals from the respective driving circuits. Each modulation electrode has a length that determines a change in phase to be caused by the modulation electrode. The modulation electrodes combined to cause phase changes make it possible to create a desired total amount of phase change, determined by the total length of the combined modulation electrodes, of the light propagating in the first arm waveguide. The interference of the light beam having a phase thus changed allows the Mach-Zehnder modulator to generate the amplitude-modulated optical signal in response to the pulse amplitude modulated signal. Specifically, the Mach-Zehnder modulator can generate an interfering light beam having multiple intensity levels, which correspond to respective optical phase changes associated with the combination of the modulation electrodes.

The optical transmission apparatus according to an embodiment further includes a timing extraction circuit receiving the pulse amplitude modulated signal, the timing extraction circuit extracting a frequency component of a clock signal from the pulse amplitude modulated signal and generating a timing signal from the frequency component, and the comparator producing a comparison result in response to the timing signal, and holding the comparison result.

The comparator operable to respond to the timing signal allows the optical transmission apparatus to make jitters in the modulated optical signal reduced.

In the optical transmission apparatus according to an embodiment, the pulse amplitude modulated signal has four levels indicating four symbols, the multiple electrodes include a first electrode and a second electrode, each of the driving circuits includes a limiting amplifier connected to the comparator, and the limiting amplifier is connected to the Mach-Zehnder modulator.

The optical transmission apparatus allows the driver to produce one electric signal to be applied to the first electrode, another electric signal to be applied to the second electrode, or the one and other electric signals to be applied, respectively, to the first electrode and the second electrode such that these electric signals enable the three phase changes.

In the optical transmission apparatus according to an embodiment, the pulse amplitude modulated signal has four levels indicating four symbols, the multiple electrodes include a first electrode, a second electrode, and a third electrode, and each of the driving circuits includes a limiting amplifier connected to the comparator, and the limiting amplifier is connected to the Mach-Zehnder modulator.

The optical transmission apparatus allows the driver to produce one electric signal to be applied to the first electrode, the one electric signal and another electric signal to be applied, respectively, to the first electrode and the second electrode, or the one and other electric signals and a further electric signal to be applied, respectively, to the first electrode, the second electrode, and the third electrode such that the combination of these electric signals enables the three phase changes.

In the optical transmission apparatus according to an embodiment, the Mach-Zehnder modulator includes a second arm waveguide, a demultiplexer connected to the first arm waveguide and the second arm waveguide, and a multiplexer connected to the first arm waveguide and the second arm waveguide, the Mach-Zehnder modulator enables optical modulation in the first arm waveguide in response to a driving of the driver.

The optical transmission apparatus enables phase modulation with the driver that applies drive signals to an arm waveguide of the Mach-Zehnder modulator.

An optical transmission apparatus according to an embodiment includes: (a) a Mach-Zehnder modulator including an arm waveguide with a plurality of electrodes; (b) a semiconductor integrated driving device having an input configured to receive a pulse amplitude modulated signal having multiple amplitude levels indicating respective symbols, and a plurality of outputs configured to supply a plurality of drive signals to the Mach-Zehnder modulator, the plurality of drive signals being associated with respective amplitudes of the pulse amplitude modulated signal such that one or more of the electrodes causes phase change of light propagating in the arm waveguide; and (c) a plurality of conductors connecting the plurality of electrodes of the arm waveguide with the semiconductor integrated driving device, the semiconductor integrated driving device including a plurality of limiting amplifiers driving the plurality of electrodes, and the plurality of limiting amplifiers being connected to the Mach-Zehnder modulator through the plurality of conductors.

The optical transmission apparatus includes multiple modulating electrodes, effecting in causing optical phase changes, the number of which is associated with the total amount of the resultant optical phase change. The modulation electrodes in the Mach-Zehnder modulator receive drive signals from the driver to cause the respective optical phase changes. The Mach-Zehnder modulator enables phase shift in light propagating in the arm waveguide to occur depending on the total period of time in which the driver drives one or more electrodes on the arm waveguide so as to cause respective phase change. Interference of light having a shifted phase allows the Mach-Zehnder modulator to generate an amplitude-modulated optical signal in response to the pulse amplitude modulated signal. Specifically, the Mach-Zehnder modulator can generate, in multiplexer, interfered light having optical intensity levels, corresponding to the respective electric intensity levels of the PAM signal, which depend upon a certain optical phase change that a part or all of the multiple modulation electrodes on the arm waveguide cause.

A semiconductor integrated driving device according to an embodiment includes: (a) an input configured to receive a pulse amplitude modulated signal having amplitude levels indicating respective symbols on an optical signal to be produced by a Mach-Zehnder modulator having a plurality of modulation electrodes; (b) a plurality of driving circuits connected to the input and generating a plurality of drive signals; and (c) a plurality of outputs connected to the plurality of driving circuits and configured to supply the plurality of drive signals to the plurality of modulation electrodes of the Mach-Zehnder modulator, the plurality of driving circuits including a plurality of comparators receiving the pulse amplitude modulated signal from the input.

In the semiconductor integrated driving device, the comparators in the driving circuits are operable to receive respective reference voltages associated with the amplitude levels of the pulse amplitude modulated signal. The semiconductor integrated driving device further includes circuits, which are connected to the respective comparators, operable to tune reference voltages corresponding to the respective amplitude levels of the pulse amplitude modulated signal.

Teachings of the present invention can be readily understood by considering the following detailed description with reference to the accompanying drawings shown as examples. Referring to the accompanying drawings, an optical transmission apparatus and a semiconductor integrated driving according to the present embodiments will be described below. To facilitate understanding, identical reference numerals are used, where possible, to designate identical elements that are common to the figures.

FIG. 1 is a schematic view showing an optical transmission apparatus according to an embodiment. The optical communication device (such as, the optical transmission apparatus 11) includes a Mach-Zehnder modulator 13 and a driver 15. The Mach-Zehnder modulator 13 includes a first arm waveguide 13a, a second arm waveguide 13b, an optical demultiplexer 13c, and an optical multiplexer 13d. The first arm waveguide 13a has a first semiconductor mesa 17a and multiple modulation electrodes 21. The second arm waveguide 13b also has a second semiconductor mesa 17b and one or more modulation electrodes 23. In the present embodiment, the demultiplexer 13c is connected to the first and second arm waveguides 13a and 13b, and the multiplexer 13d is connected to the first and second arm waveguides 13a and 13b. The driver 15 drives the Mach-Zehnder modulator 13 in response to the pulse amplitude modulated signal $S_{PAM}$ (referred to as "PAM" signal). The driver 15 includes multiple driving circuits 25 (25a, 25b, and 25c), which are connected to the respective modulation electrodes 21 (23), and the drive circuits 25 includes comparators 27 (27a, 27b, and 27c) therein, which receive the common pulse amplitude modulated signal $S_{PAM}$. The pulse amplitude modulated signal $S_{PAM}$ of an electric signal has multiple voltage levels that correspond to respective symbols.

The optical transmission device 11 allows the comparators 27 in the drive circuits 25 to generate respective electric signals, each of which determines a phase change of light to be caused thereby, in response to the pulse amplitude modulated signal $S_{PAM}$, and these electric signals are applied to the respective modulation electrodes 21 (23), which are coupled to the respective drive circuits 25 including the comparators 27. Specifically, the comparators 27 produce an electric pulse signal $S_{PL1S}$, an electric pulse signal $S_{PL2S}$, and an electric pulse signal $S_{PL3S}$ from the pulse amplitude modulated signal $S_{PAM}$. Each of the electric pulse signals $S_{PL1S}$, $S_{PL2S}$, and $S_{PL3S}$, defines a desired period of time in which a certain modulation electrode (for example, the first electrode 21a) among the modulation electrodes 21 on the first arm waveguide 13a causes a significant phase change of the light. The first electrode 21a, the second electrode 21b, and the third electrode 21c have respective lengths that are associated with the phase change to be caused thereby. The modulation electrodes 21 (23) in the Mach-Zehnder modulator 13 receive the modulation signals (SM1D, SM2D, and SM3D) from the driving circuits 25. The Mach-Zehnder modulator 13 associates the total length of the modulation electrode(s) 21 with change in the phase of the light propagating in the first arm waveguide 13a. Interference of the light having a phase thus changed allows the Mach-Zehnder modulator 13 to generate the amplitude-modulated output light $L_{OUT}$ in response to the pulse amplitude modulated signal $S_{PAM}$. Specifically, the modulation electrodes 21 (21a, 21b, and 21c) on the first arm waveguide 13a are effective in generating a number of optical phase changes. The combination of optical phase changes allows the Mach-Zehnder modulator 13 allows interfering light thus generated to have several light intensities. If needed, the Mach-Zehnder modulator 13 may produce an interfering light from both an optical phase change caused by the modulation electrodes 23 (23a, 23b, and 23c) in the second arm waveguide 13b and an optical phase change in the first arm waveguide 13a.

The drive circuits 25 include amplifiers 29 (29a, 29b, and 29c), which receive electric signals from the respective comparators 27 (27a, 27b, and 27c). The amplifiers 29 each generate the drive signal, and may include, for example, respective limiting amplifiers, which are connected to the modulation electrodes (21a, 21b, and 21c, or 23a, 23b, and 23c) of the Mach-Zehnder modulator 13 via interconnects. The amplifiers 29 (29a, 29b, and 29c) produce output signals of substantially the same amplitude. The limiting amplifiers of the drive circuits 25 can generate the first, second and third modulation signals SM1D, SM2D, and SM3D in differential signal form.

If necessary, the Mach-Zehnder modulator 13 includes additional electrodes (21d, 23d, and 31d), which enable optical phase change independent of that caused by the modulation electrodes (21a, 21b, and 21c, and 23a, 23b, and 23c). Specifically, the first arm waveguide 13a may further include an additional electrode 21d which can adjust the phase of light. The additional electrode 21d can shift the phase of the light propagating in the first arm waveguide 13a from the original value, e.g., zero. Similarly, the second arm waveguide 13b may also include an additional electrode (23d) which can adjust the phase of light. The additional electrode (23d) can shift the phase of light propagating in the second arm waveguide 19a from the original value, e.g., zero. The driver 15 may include an electrical circuit 33 that supplies an electric signal PH0 defining an initial phase, and the electrical signal PH0 is applied to the additional electrodes 21d, 23d, and 31d.

Alternatively, the driver 15 can generate a single driving signal to drive a single waveguide, i.e., one of the first and second arm waveguides 13a and 13b of the Mach-Zehnder modulator 13. In the Mach-Zehnder modulator 13 according to the present embodiment, one light beam in the first arm waveguide 13a, which the demultiplexer 13c supplies thereto, is subjected to optical phase change in response to the driving of the driver 15, and another light beam in the second arm waveguide 13b, which the demultiplexer 13c (optical branching circuit) supplies thereto, is subjected to substantially no optical phase change. These optical beams reach the multiplexer 13d. If needed, one light beam in the second arm waveguide 13b, which the demultiplexer 13c supplies thereto, is subjected to optical phase change in response to the driving of the driver 15, and another light beam in the first arm waveguide 13a, which the demultiplexer 13c supplies thereto, is subjected to substantially no optical phase change, these optical beams reach the multiplexer 13d.

Figure 2:
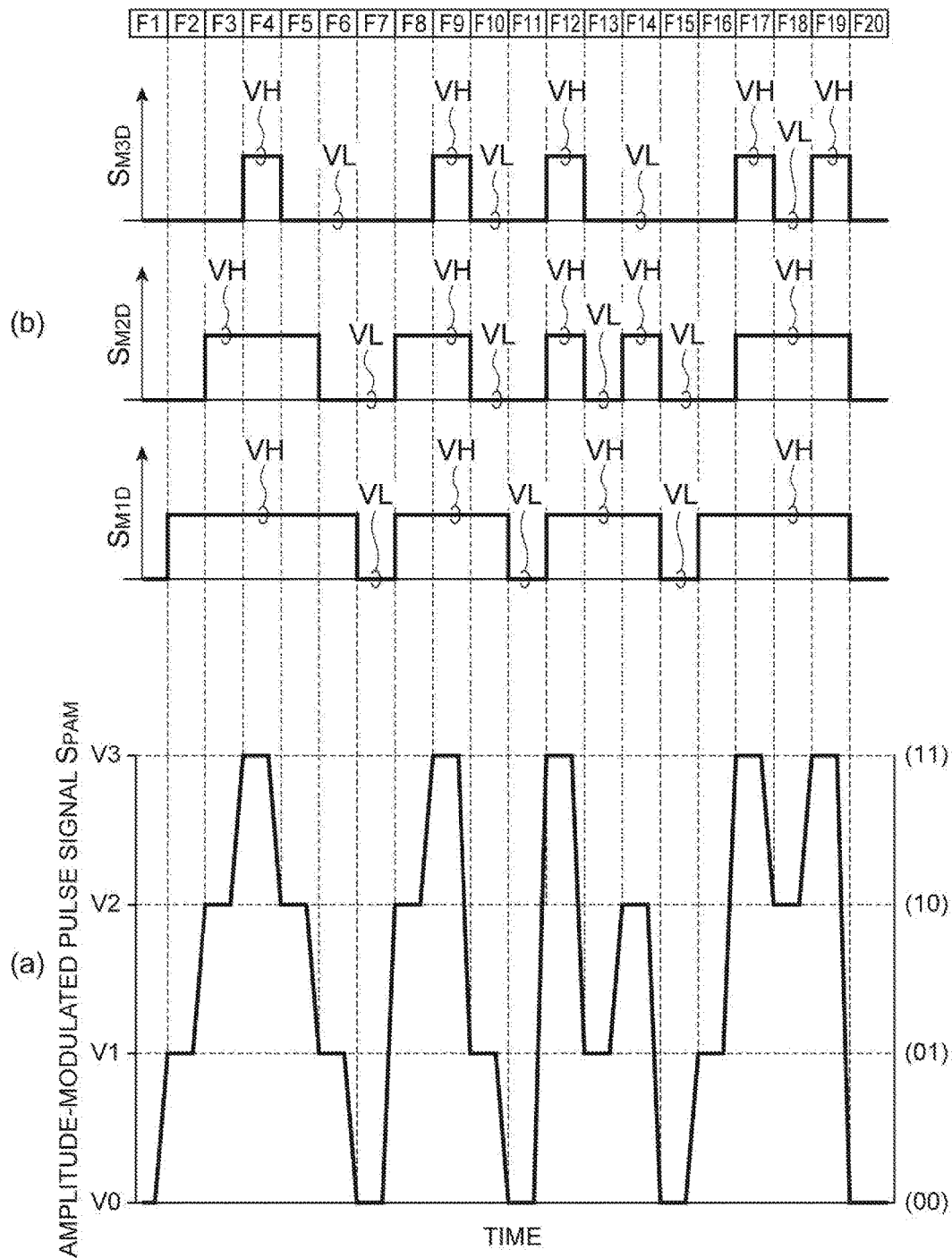
FIG. 2 is a view showing exemplary waveforms of driving electric signals and the PAM signal applicable to a driver according to the present embodiment.
Figure 3:
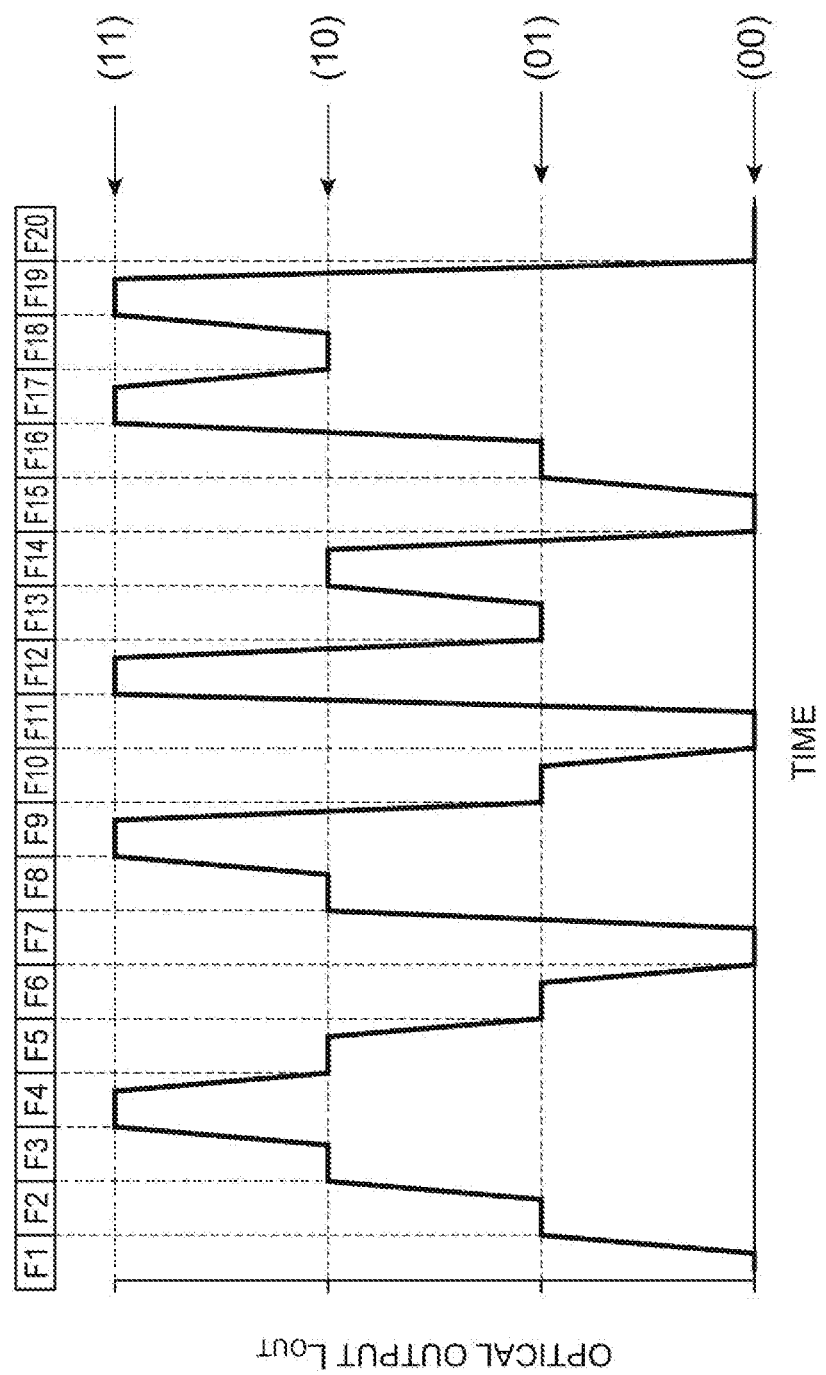
FIG. 3 is a view illustrating an optical signal that a Mach-Zehnder modulator generates in response to the PAM signal shown in FIG. 2 according to the present embodiment.

FIG. 2 is a diagram illustrating a waveform of a PAM signal to be supplied to a driver according to the present embodiment, where the horizontal axis represents time, and the vertical axes on the left and right sides represent the amplitude of the PAM signal, and symbol values, which correspond to the amplitudes of the PAM electric signal, respectively. FIG. 3 is a view illustrating the waveform of an optical signal generated by the Mach-Zehnder modulator 13 according to the present embodiment in response to the PAM electric signal shown in FIG. 2, where the horizontal axis represents time, and the vertical axes on the left and right sides represent the amplitude of the optical output, and the symbol values, which correspond to the amplitudes of the PAM electric signal, respectively.

The PAM electric signal shown in part (a) of FIG. 2 is supplied to the driver 15 including three comparators 27, and the first arm waveguide 13a has three modulation electrodes (21a, 21b, and 21c). The comparators 27 (27a, 27b, and 27c) receives the PAM electric signal, and generate the pulse electric signals $S_{PL1S}$, $S_{PL2S}$ and $S_{PL3S}$ with reference to the reference signals (REF1, REF2, and REF3), respectively. The reference signals (REF1, REF2, and REF3) are supplied by reference voltage sources 35 (35 a, 35 b, 35 c). The reference voltage sources 35 each generate a reference signal (for example, a constant reference voltage), and can tune it according to an electric signal from the outside.

Referring to part (b) of FIG. 2, a sequence of frames F1 to F20 is shown. The operation in several exemplary frames will be described in detail below.

Frame 4.

The comparators 27 produces electric pulse signals $S_{PL1S}$, $S_{PL2S}$ and $S_{PL3S}$ from the PAM signal, and the limiting amplifiers in the amplifiers 29 generate the first, second and third modulation signals SM1D, SM2D, and SM3D, each of which has a high voltage level VH, in response to the electric pulse signals $S_{PL1S}$, $S_{PL2S}$ and $S_{PL3S}$. The first, second and third modulation signals SM1D, SM2D, and SM3D each having the high voltage level VH are applied to the three modulation electrodes (21a, 21b, and 21c) in the first arm waveguide 13a to cause a significant change in phase, which is determined by the total length of the active modulation electrodes (21a, 21b, and 21c), of light propagating therein. Accordingly, the Mach-Zehnder modulator 13 generates the optical signal of frame 4 in FIG. 3.

Frame 7.

The comparator s27 produce an electric pulse signals $S_{PL1S}$, $S_{PL2S}$ and $S_{PL3S}$ from the PAM signal, and the limiting amplifiers in the amplifiers 29 generate the first, second and third modulation signals SM1D, SM2D, and SM3D of, each of which has a low voltage level VL, in response to the electric pulse signals $S_{PL1S}$, $S_{PL2S}$ and $S_{PL3S}$. The first, second and third modulation signals SM1D, SM2D, and SM3D each having the low voltage level VL are applied to the three modulation electrodes (21a, 21b, and 21c) in the first arm waveguide 13a to cause no significant change in the phase, which is determined by the total length of the inactive modulation electrodes (21a, 21b, and 21c), of light propagating therein. Accordingly, the Mach-Zehnder modulator 13 generates the optical signal of frame 7 in FIG. 3.

Frame 8.

The comparators 27 produces electric pulse signals $S_{PL1S}$, $S_{PL2S}$ and $S_{PL3S}$ from the PAM signal, and the limiting amplifiers in the amplifiers 29 generate the first and second modulation signals SM1D and SM2D, each of which has the high voltage level VH, and the third modulation signal SM3D, which has the low voltage level VL, in response to the electric pulse signals $S_{PL1S}$, $S_{PL2S}$ and $S_{PL3S}$. The first arm waveguide 13a receive the first and second modulation signals SM1D and SM2D each having the high voltage level VH on the modulation electrodes (21a and 21b), to cause a large change in phase, which is determined by the total length of the active modulation electrodes (21a and 21b), of light propagating therein, and the third modulation signal SM3D of the low voltage level VL on the modulation electrode (21c) to cause no change in phase, which is determined by the length of the inactive modulation electrode (21c), of light propagating therein. Accordingly, the Mach-Zehnder modulator 13 generates the optical signal of frame 8 in FIG. 3.

Frame 16.

The comparators 27 produces electric pulse signals $S_{PL1S}$, $S_{PL2S}$ and $S_{PL3S}$ from the PAM signal, and the limiting amplifiers in the amplifiers 29 generate the first modulation signal SM1D, which has the high voltage level VH, and the second and third modulation signals SM2D and SM3D, each of which has the low voltage level VL, in response to the electric pulse signals $S_{PL1S}$, $S_{PL2S}$ and $S_{PL3S}$. The first arm waveguide 13a receive the first modulation signal SM1D of the high voltage level VH on the modulation electrode (21a) to cause a significant change in phase, which is determined by the length of the modulation electrode (21a), of light propagating therein, and the second and third modulation signals SM2D and SM3D each having the low voltage level VL on the modulation electrodes (21b and 21c) to cause no change in phase, which is determined by the total length of the inactive modulation electrodes (21b and 21c), of light propagating therein. Accordingly, the Mach-Zehnder modulator 13 generates the optical signal of frame 16 in FIG. 3.

In this optical transmission apparatus 11, the number of modulation electrodes used to cause the phase change of light is associated with the amount of the resulting change in optical phase. The multiple modulation electrodes 21 on the first arm waveguide 13a of the Mach-Zehnder modulator 13 receive the drive signal, which is used to cause phase change, from the driver 15. The Mach-Zehnder modulator 13 enables the phase modulation, the amount of which is determined by the period of time in which one or more modulation electrodes each apply a large electric field to the waveguide, of the light beams propagating in the arm waveguides (13a and 13b). The Mach-Zehnder modulator 13 generates an amplitude-modulated pulse light output $L_{OUT}$, which is produced by the interference of light having the phase thus changed, in response to the pulse amplitude modulated signal (the PAM signal). Specifically, the Mach-Zehnder modulator 13 generates an interfering light beam that can have multiple optical levels in intensity, depending upon change in optical phase caused by combination of the multiple modulation electrodes 21.

In the present embodiment, the driver 15 may be included in the semiconductor integrated driving device DEVD (the first semiconductor chip), and the Mach-Zehnder modulator 13 may be included in the semiconductor optical modulation device DEVM (the second semiconductor chip), and these devices are separate from each other. The semiconductor integrated driving device DEVD includes both an input terminal DSIN configured to receive a pulse amplitude modulated signal SPAM having multiple amplitudes (V0, V1, V2, and V3) corresponding to multiple symbols to be transmitted, and one or more output terminals DSOT configured to drive the Mach-Zehnder modulator 13 in response to the pulse amplitude modulated signal SPAM such that the electrodes thus driven in the arm waveguide (13a) cause phase change of light propagating therein.

The comparators 27 each senses the PAM signal of quaternary levels to produce an electrical pulse signal of binary levels therefrom. The semiconductor integrated driving device DEVD incorporates the comparators 27 and the amplifiers 29 to form an integrated device. The integration makes the distance of transmission of the electric signals from the comparators 27 to the amplifiers 29 reduced, and the pulse electric signals to the amplifiers 29 less attenuated. The reduction in transmission distance is unlikely to cause skew (difference in arrival time from the comparators 27 to the amplifiers 29). The conversion from the quaternary PAM signal to the binary electric pulse signals also can reduce such skew. The signal conversion with the comparators 27 makes it less likely that the quality of the optical signal is degraded by distortion and attenuation that may occur in the transmission of electric signals. The limiting amplifier in each amplifier 29 can give the drive signal with less distortion to the modulation electrodes of the Mach-Zehnder modulator in the optical transmission device 11. Such a drive signal allows the Mach-Zehnder modulator to generate a PAM optical signal of excellent quality.

Figure 4A:
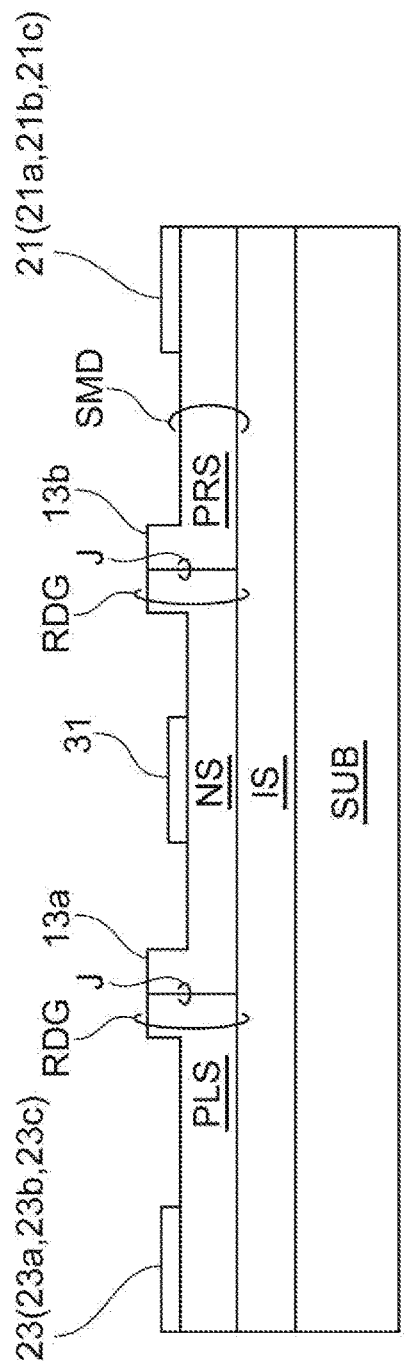
FIG. 4A is a cross-sectional view showing the first arm waveguide and the second arm waveguide in the semiconductor optical modulator.
Figure 4B:
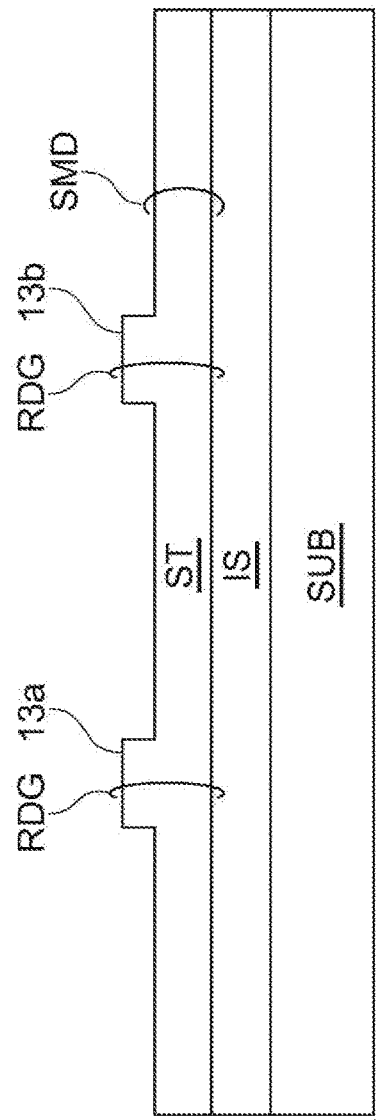
FIG. 4B is a cross-sectional view showing the first arm waveguide and the second arm waveguide in the semiconductor optical modulator.

FIGS. 4A and 4B are cross-sectional views each showing the first and second arm waveguides 13a and 13b in the semiconductor optical modulating device. The cross-section in FIG. 4A is taken along line IVa-IVa in FIG. 1, and the cross-section in FIG. 4B taken along line IVb-IVb in FIG. 1. The semiconductor optical modulating device DEVM can be made of, for example, silicon-based semiconductor elements, and is fabricated by a technique for processing silicon-based semiconductor. The semiconductor optical modulating device DEVM includes a substrate SUB, a silicon oxide region IS disposed on the substrate SUB, and a silicon region SMD disposed on the silicon oxide region IS. The silicon region SMD includes a semiconductor ridge RDG for the first and second arm waveguides 13a and 13b. The semiconductor ridge RDG extends in the direction of the waveguide axis. Referring to FIG. 4A, the first and second arm waveguides 13a and 13b is provided with electrodes (21, 23, and 31), which cause phase modulation, and a pn-junction J between the p-type semiconductor PLS and the n-type semiconductor NLS, which extends along the direction of the waveguide axis. The p-side electrode (21, and 23) and the n-side electrode (31) are connected to the p-type semiconductor PLS and the n-type semiconductor NS, respectively, to apply voltage to the pn-junction J. The application of voltage to the pn-junction J causes phase change of the light propagating in the semiconductor waveguide. The amount of change in phase depends on the length of the semiconductor waveguide that can contribute to the phase change (i.e., the total length of the active electrodes applying voltage contributing to the phase change in the semiconductor waveguide). Referring to FIG. 4B, the silicon region SMD includes an i-type semiconductor ST, which can transmit light without phase modulation.

EXAMPLE 1

Figure 5:
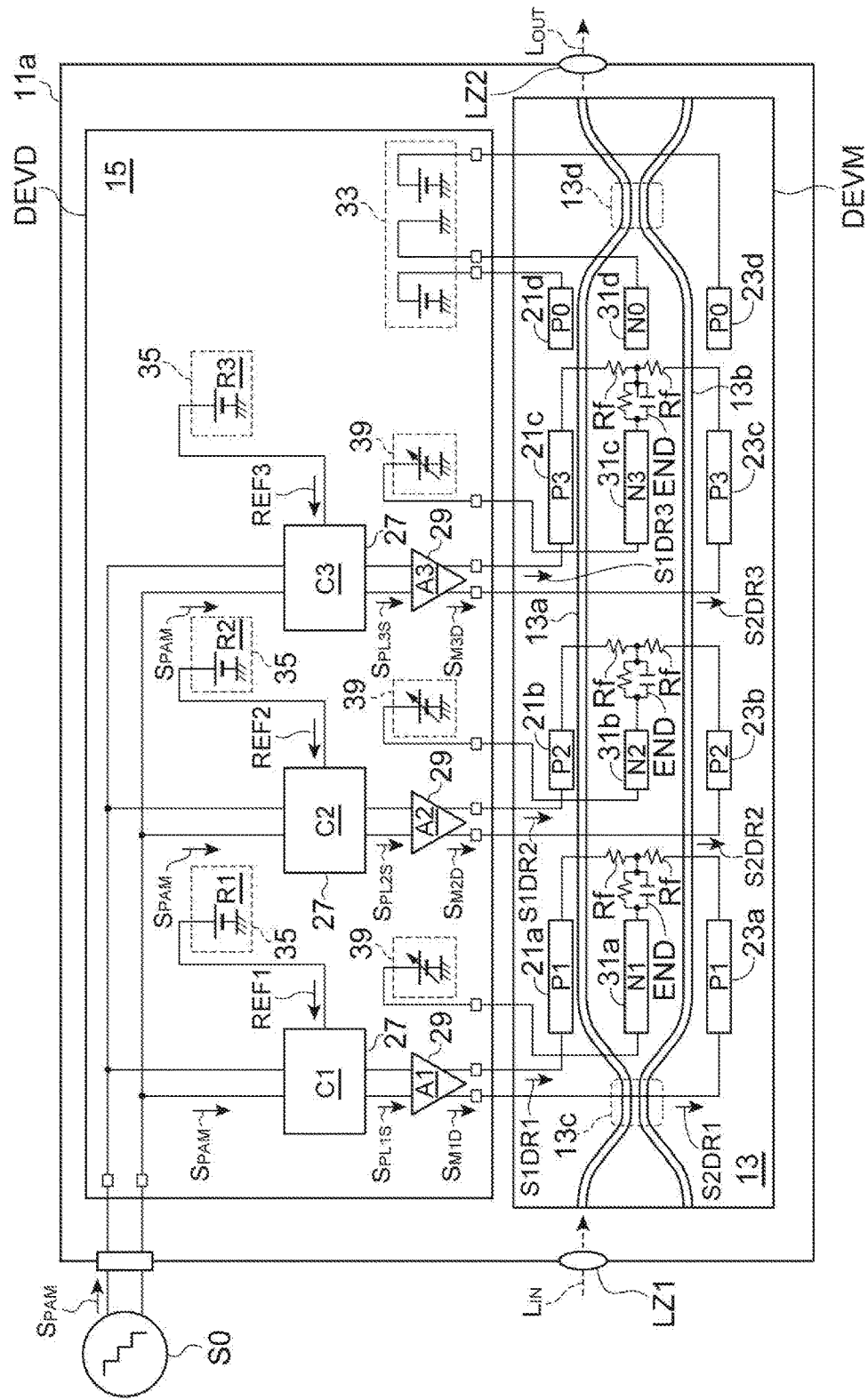
FIG. 5 is a schematic view showing an optical transmitter according to example 1.

FIG. 5 is a schematic view showing the optical transmission device 11a according to the first embodiment. In the optical transmission device 11a, the driver 15 operates in response to the PAM signal shown in FIG. 2. The PAM signal is supplied from the signal source S0 to the optical transmission device 11a. Specifically, the comparator 27 include a first comparator circuit C1, a second comparator circuit C2, and a third comparator circuit C3, which receive respective reference levels (REF 1, REF 2, REF 3) from a reference voltage source 35, such as a reference voltage circuit, (a first reference voltage circuit R1, a second reference voltage circuit R2, and a third reference voltage circuit R3). The amplifier 29 includes a first amplifier A1, a second amplifier A2, and a third amplifier A3. The first, second, and third amplifiers A1, A2, and A3 generate respective differential signals. The limiting amplifiers in the amplifier 29 generate the first modulation signal SM1D, the second modulation signal SM2D, and the third modulation signal SM3D in differential form. The first and second arm waveguides 13a and 13b of the Mach-Zehnder modulator 13 receive differential signals (SM1D, SM2D, and SM3D) from the drive circuit 25. Specifically, the amplifier 29 (29a, 29b, and 29c) in the driver 15 generates the first group of drive signals (S1DR1, S1DR2, and S1DR3) and the second group of drive signals (S2DR1, S2DR2, S2DR3) that drive the first and second arm waveguides 13a and 13b of the Mach-Zehnder modulator 13, respectively.

The first amplifier 29a (A1) generates a pair of first differential signals (S1DR1 and S2DR1), and the first differential signals (S1DR1 and S2DR1) in the pair are applied to the first electrodes 21a (P1) and 23a (P1) of the first arm waveguides 13a and second arm waveguides 13b, respectively. The second amplifier 29b (A2) generates a pair of second driving differential signals (S1DR2 and S2DR2), and the second driving differential signals (S1DR2 and S2DR2) in the pair are applied to the second electrodes 21b (P2) and 23b (P2) of the first and second arm waveguides 13a and 13b, respectively. The third amplifier 29c generates a pair of first drive signals (S1DR3 and S2DR3), and the third drive differential signals (S1DR3 and S2DR3) in the pair are applied to the third electrodes 21c (P3) and 23c (P3) of the first and second arm waveguides 13a and 13b, respectively.

The modulation electrodes 21 (the first electrode 21a (P1), the second electrode 21b (P2), and the third electrode 21c (P3)) of the first arm waveguide 13a receive the first group of drive signals (S1DR1, S1DR2, and S1DR3) from the amplifiers 29 (29a (A1), 29b (A2), and 29c (A3)). The modulation electrodes 23 (the first electrode 23 a (P1), the second electrode 23 b (P2), and the third electrode 23 c (P3)) of the second arm waveguide 13b receive the second group of drive signals (S2DR1, S2DR2, S2DR3) from the amplifiers 29 (29a (A1), 29b (A2), and 29c (A3)).

The differential signals (SM1D, SM2D, and SM3D) of the semiconductor drive integrated device DEVD are supplied to the modulation electrodes (P1, P2, and P3) in the Mach-Zehnder modulator 13 through respective interconnects.

The optical transmission device 11a allows the driver 15 to enable three kinds of phase changes as follows: phase change due to a signal applied to the first electrode (P1); phase change due to two signals applied to the first electrode (P1) and the second electrode (P2); and phase change due to three signals applied to the first electrode (P1), the second electrode (P2) and the third electrode (P3).

The Mach-Zehnder modulator 13 receives the input light $L_{IN}$ via the first lens LZ1. The demultiplexer 13c divides the input light $L_{IN}$ to the first and second arm waveguides 13a and 13b. The first and second arm waveguides 13a and 13b change the phase of the input light $L_{IN}$ in response to the application of the differential signals (SM1D, SM2D, and SM3D) to the modulation electrodes (P1, P2, and P3). The multiplexer 13d receives the light beams from the first and second arm waveguides 13a and 13b to produce interfering light (output light $L_{OUT}$) from these light beams. The output light $L_{OUT}$ is output to the second lens LZ2.

An Exemplary Mach-Zehnder Modulator 13.

Terminating resistance Rf: Resistance value almost equal to the characteristic impedance of the arm waveguide (transmission line) including the modulation electrodes and the semiconductor mesa. Terminating circuit END: Circuit including a resistor and a capacitor. Constant voltage source 39 (voltage source circuit): bias voltage applied to make phase change, caused by the differential signal (SM1D, SM2D, and SM3D) applied to the arm waveguide, appropriate.

The terminating resistor, the termination circuit, and the constant voltage source may be included by either the optical modulator DEVM for the Mach-Zehnder modulator 13 or the semiconductor driving integrated device DEVD for driver 15. If necessary, the terminating resistor, the termination circuit, and the constant voltage source may be disposed outside the semiconductor optical modulation device DEVM and the semiconductor driving integrated device DEVD.

Size of the optical transmission apparatus (length, width, height): 18.4 mm×72 mm×8.5 mm.

Chip size of the semiconductor optical modulation device DEVM: 2 mm×5 mm.

Width of silicon semiconductor for the waveguide: 400 nanometers.

Length of the arm waveguide: 4 mm.

The ratio of the lengths of the modulation electrodes (P1:P2:P3) is 4:2:4. In the present embodiment, the following sizes are used.

Lengths of modulation electrodes (P1, P2, and P3): (1.2 mm, 0.8 mm, 1.2 mm).

Width of electrode: 80 micrometers.

Spacing between p-side and n-side electrodes: 15 micrometers.

The interval between the modulation electrodes (the interval between electrodes P1 and P2 on the waveguide axis, and the interval between electrodes P2 and P3): 100 micrometers.

The input light $L_{IN}$ has, for example, a wavelength of 1.3 micrometers and has a constant optical intensity, which does not vary over time.

The period of one frame is 100 picoseconds.

First reference voltage (REF1): 0.167 (relative value).

Second reference voltage (REF2): 0.500 (relative value).

Third reference voltage (REF3): 0.833 (relative value).

The range of 0 to 1 in light intensity is fully used; the difference in light intensity between adjacent two digits is made large; unmodulated light indicating the zero level can be quenched; and light intensities indicating respective digits can be spaced equally.

Figure 6:
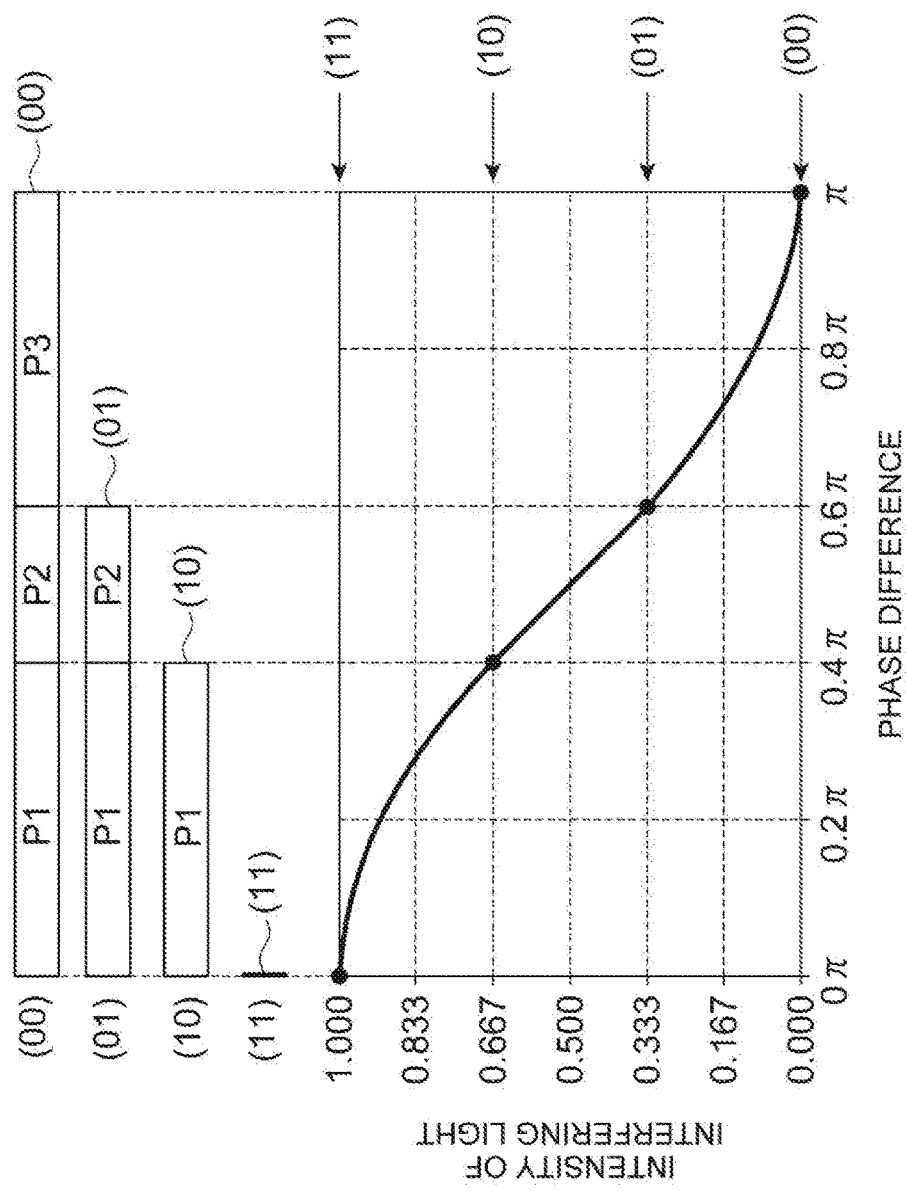
FIG. 6 is a view showing an exemplary PAM electrical signal and the relationship between the phase difference of two light beams in the respective arm waveguides and the intensity of the interfering light produced from the light beams in the two arm waveguides.

FIG. 6 is a view showing the relationship between the intensity of the interference light and the phase difference between two light beams in the arm waveguides. FIG. 6 shows a characteristic curve indicating that the intensity of the interfering light produced from the light beams in the two arm waveguides is not proportional to the difference in phase between the two light beams in the full range. As will be understood from the following description, combining the three modulation electrodes (P1, P2, and P3) can associate the light intensities of zero, 0.333, 0.667 and 1.0 (relative intensity) with symbols (1,1), (1,0), (0,1), and (0,0), respectively.

Generation of Symbol (00).

In order to generate symbol (00), the drive circuit 25 generates differential signals (SM1D, SM2D, and SM3D) such that all of the modulation electrodes (P1, P2, and P3) are used to cause phase change, and the multiplexer 13d receives the light beams from the first and second arm waveguides 13a and 13b to produce an output light $L_{OUT}$ having an intensity of substantially zero with respect to that of the input light $L_{IN}$. This output is associated with symbol (00).

Generation of Symbol (01).

In order to generate symbol (01), the drive circuit 25 generates the differential signals (SM1D, SM2D, and SM3D) such that the modulation electrodes (P1 and P2) among the modulation electrodes (P1, P2, and P3) are used to cause phase change, and the multiplexer 13d receives the light beams from the first and second arm waveguides 13a and 13b to produce an output light $L_{OUT}$ having an intensity of 0.333 times as large as that of the input light $L_{IN}$. This output is associated with symbol (01).

Generation of Symbol (10).

In order to generate the symbol (10), the drive circuit 25 generates the differential signals (SM1D, SM2D, and SM3D) such that the modulation electrode (P1) among the modulation electrodes (P1, P2, and P3) is used to cause phase change, and the multiplexer 13d receives the light beams from the first and second arm waveguides 13a and 13b to produce an output light $L_{OUT}$ having an intensity of 0.667 times as large as that of the input light $L_{IN}$. This output is associated with symbol (10).

Generation of Symbol (11).

In order to generate the symbol (11), the drive circuit 25 generates the differential signals (SM1D, SM2D, and SM3D) so that none of the modulation electrodes (P1, P2, and P3) are used to cause phase change, and the multiplexer 13d receives the light beams from the first and second arm waveguides 13a and 13b to produce an output light $L_{OUT}$ having substantially the same intensity as the input light $L_{IN}$. This output is associated with symbol (11).

If necessary, the additional electrodes (21d, 23d, and 31d) are used to at least one of the first and second arm waveguides 13a and 13b to enable fine tuning of phase.

EXAMPLE 2

Figure 7:
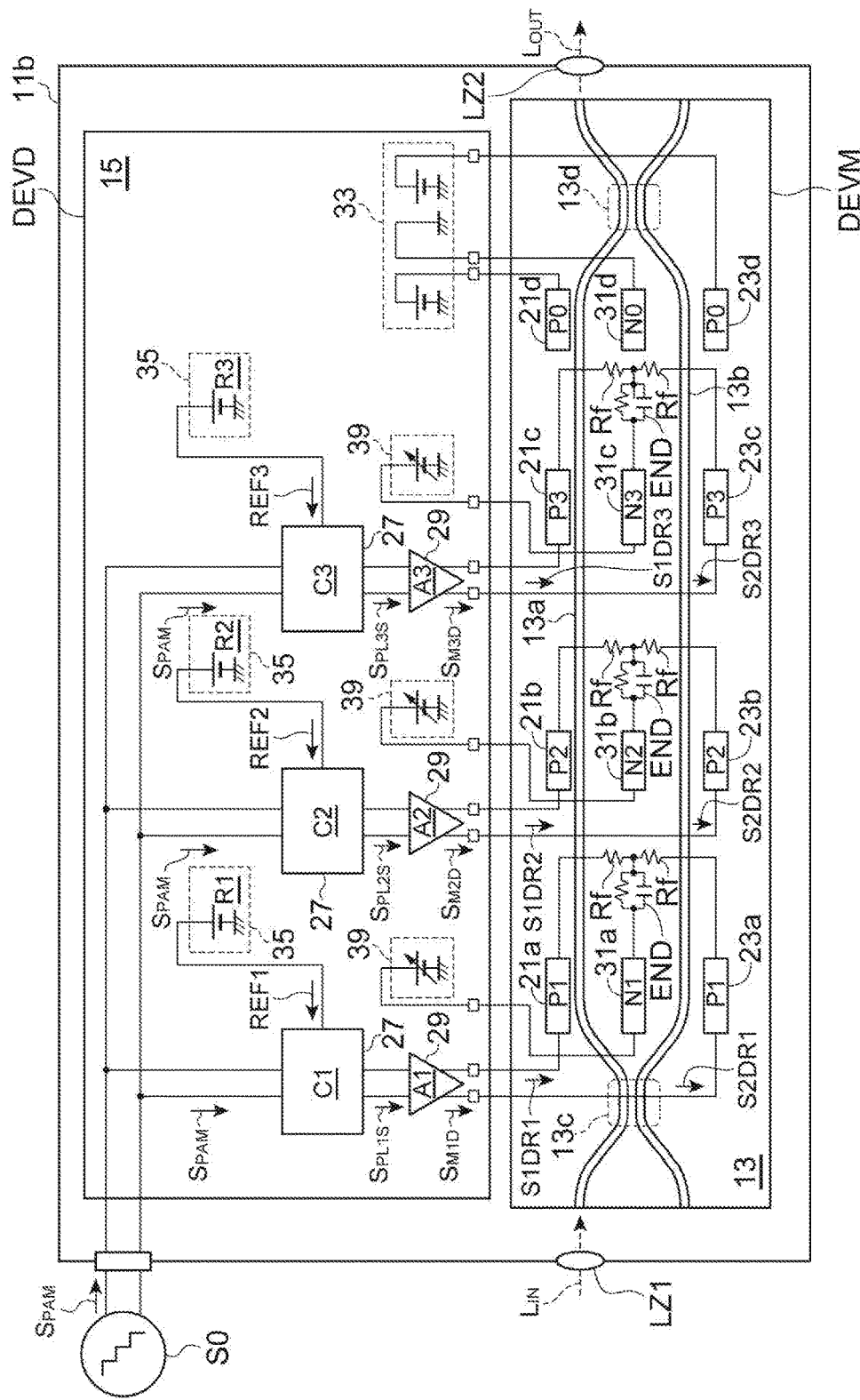
FIG. 7 is a schematic view showing an optical transmitter according to example 2.

FIG. 7 is a schematic view showing an optical transmission device 11b according to the second embodiment. In the optical transmission device 11b, the driver 15 also operates in response to the PAM signal shown in FIG. 2. The PAM signal is supplied by the signal source S0 to the optical transmission device 11b. Specifically, the comparators 27 in the optical transmission device 11b include, similarly to the optical transmission device 11a, a first comparator circuit C1, a second comparator circuit C2, and a third comparator circuit C3, and these comparators (C1, C2, and C3) receive reference signals (REF1, REF2, and REF3) from respective reference voltage circuits (R1, R2, and R3). The drive circuit 25 includes amplifiers (A1, A2 and A3), and these amplifiers (A1, A2 and A3) generate respective differential signals. The first and second arm waveguides 13a and 13b in the Mach-Zehnder modulator 13 receive differential signals (SM1D, SM2D, and SM3D) from the drive circuit 25. In the optical transmission device 11b, the Mach-Zehnder modulator 13 has shorter modulation electrodes (P1 and P3) than those of the Mach-Zehnder modulator 13 in the optical transmission device 11a. The ratio of the lengths of the modulation electrodes (P1, P2, and P3) is 1:1:1. In the present embodiment, the following sizes are used. Lengths of modulation electrodes (P1, P2, and P3): (1.0 mm, 1.0 mm, 1.0 mm)

Figure 8:
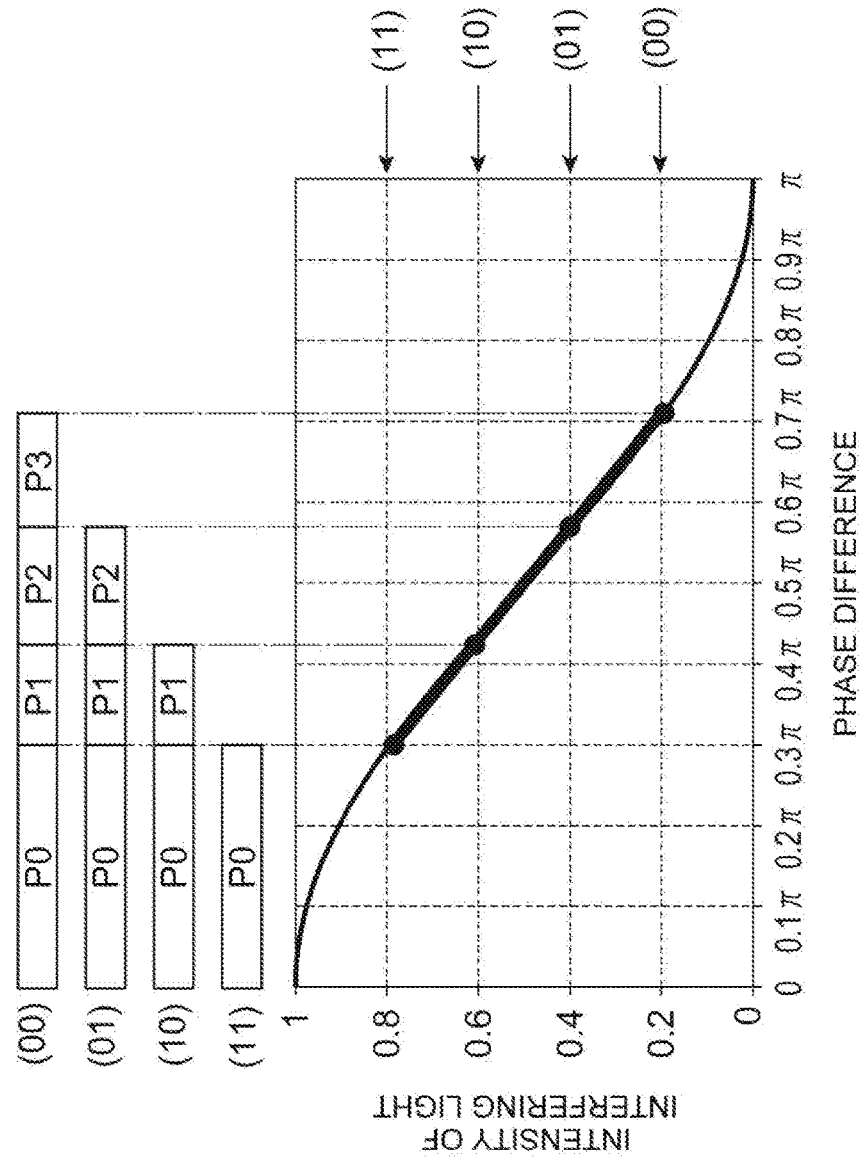
FIG. 8 is a view showing an exemplary PAM electrical signal and the relationship between the phase difference of two light beams in the respective arm waveguides and the intensity of the interfering light produced from two light beams in the respective arm waveguides.

FIG. 8 is a view showing the relationship between the intensity of the interfering light and the difference in phase between the light beams of the two arm waveguides. FIG. 8 shows a characteristics curve indicating that the intensity of the interference light produced from two light beams in the arm waveguides is not proportional to the phase difference between these two light beams in the full range, and is in a substantially linear relationship (linear relationship) in a range of 0.2 to 0.8. As will be understood from the following description, combining the additional electrode (P 0) and the three modulation electrodes (P1, P2, and P3) can associate the symbols (00), (01), (10) and (11) with light intensities of 0.2, 0.4, 0.6, and 0.8 (relative intensity). Using the additional electrodes (21d, 23d, and 31d) can tune the phase of light propagating in the arm waveguide to cause phase shift of about 0.3π independent of symbol values. The modulation electrodes (P1, P2, and P3) are used to produce phase shifts for respective symbols (00), (01), (10) and (11) with reference to the above shifted phase. The optical transmission apparatus 11b, which uses a linear range of the characteristics in the above figure to enable phase modulation, can make the length of each of the modulation electrodes (P1, P2, and P3) shorter than that of the optical transmission apparatus 11a, so that the Mach-Zehnder modulator 13 can be provided with short arm waveguides.

Generation of Symbol (00).

In order to generate symbol (00), the driver 15 produces differential signals (SM1D, SM2D, and SM3D) such that all of the modulation electrodes (P1, P2, and P3) are effective in causing phase change, and the multiplexer 13d receives the light beams from the first and second arm waveguides 13a and 13b to provide an output light $L_{OUT}$ having an intensity of substantially 0.2 times as large as that of the input light $L_{IN}$. This output is associated with symbol (00).

Generation of Symbol (01).

In order to generate symbol (01), the driver 15 produces the differential signals (SM1D, SM2D, and SM3D) such that the modulation electrodes (P1 and P2) of the modulation electrodes (P1, P2, and P3) are effective in causing phase difference, and the multiplexer 13d receives the light beams from the first and second arm waveguides 13a and 13b to provide an output light $L_{OUT}$ having an intensity of 0.4 times as large as that of the input light $L_{IN}$. This output is associated with symbol (01).

Generation of Symbol (10).

In order to generate symbol (10), the driver 15 generates the differential signals (SM1D, SM2D, and SM3D) such that the modulation electrode (P1) of the modulation electrodes (P1, P2, and P3) is effective in causing phase change, and the modulation electrodes (P2 and P3) thereof is used to cause no phase change, and the multiplexer 13d receives the light beams from the first and second arm waveguides 13a and 13b to provide an output light $L_{OUT}$ having an intensity of 0.6 times as large as that of the input light $L_{IN}$. This output is associated with symbol (10).

Generation of symbol (11).

In order to generate symbol (11), the driver 15 generates differential signals (SM1D, SM2D, and SM3D) such that the modulation electrodes (P1, P2, and P3) are used to cause no phase change, the multiplexes 13d receives the light beams from the first and second arm waveguides 13a and 13b to provide an output light $L_{OUT}$ having an intensity of 0.8 times as large as that of the input light $L_{IN}$. This output is associated with symbol (11).

The Mach-Zehnder modulator 13 receives the input light $L_{IN}$ through the first lens LZ1. The optical divider 13c divides the input light $L_{IN}$ to the first and second arm waveguides 13a and 13b. The first and second arm waveguides 13a and 13b change the phase of the input light $L_{IN}$ in response to the application of the phase-adjusting signal to the additional electrodes (21d, 23d, and 31d) and the differential signals (SM1D, SM2D, and SM3D) to the modulation electrodes (P1, P2, and P3). The multiplexer 13d receives the light beams from the first and second arm waveguides 13a and 13b to produce interfering light (output light $L_{OUT}$) from these light beams. The output light $L_{OUT}$ is output to the second lens LZ 2.

EXAMPLE 3

Figure 9:
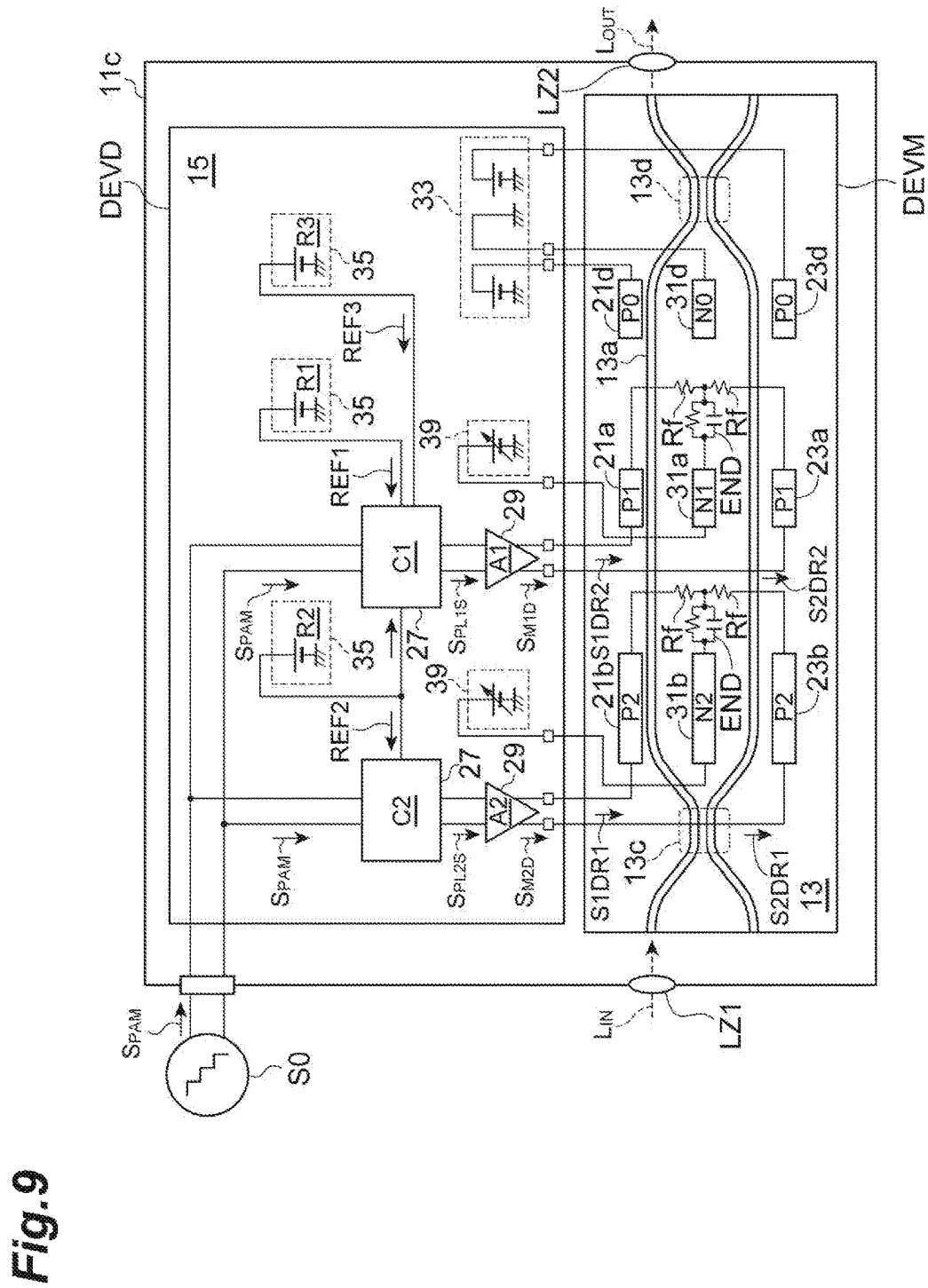
FIG. 9 is a schematic view showing an optical transmitter according to example 3.

FIG. 9 is a schematic view showing an optical transmission device 11c according to the third embodiment. In the optical transmission device 11c, the driver 15 is operable in response to the PAM signal shown in FIG. 2. The PAM signal is supplied by the signal source S0 to the optical transmission device 11c. Specifically, the comparators 27 of the optical transmission device 11c include a first comparator circuit C1 and a second comparator circuit C2, and these comparators (C1 and C2) compare the reference voltage circuits (R1, R2 and R3) from the reference signals (REF1, REF2 and REF3). The drive circuit 25 includes amplifiers (A1 and A2), and these amplifiers (A1 and A2) generate respective differential signals. In response to the pulse amplitude modulated signal $S_{PAM}$, supplied to the input of the drive, which is not less than the first reference voltage (REF1) and not more than the second reference voltage (REF2) or is not less than the third reference voltage (REF3), the first comparator circuit C1 sends the amplifier (A1) the electric pulse signal $S_{PL1S}$ allowing this amplifier to generate the voltage value VH, and otherwise, sends the amplifier (A1) the electric pulse signal $S_{PL1S}$ allowing this amplifier to generate the voltage value VL. In response to the pulse amplitude modulated signal $S_{PAM}$, supplied to the input of the drive, which is greater than or equal to the second reference voltage (REF2), the second comparator circuit C2 sends the amplifier (A2) the electric pulse signal $S_{PL2S}$ allowing this amplifier to generate the voltage value VH, and otherwise, sends the amplifier (A2) the electric pulse signal $S_{PL2S}$ allowing this amplifier to generate the voltage value VL. The first and second arm waveguides 13a and 13b of the Mach-Zehnder modulator 13 receive the differential signals (SM1D and SM2D) from the drive circuit 25. In the optical transmission device 11c, the Mach-Zehnder modulator 13 has modulating electrodes (P1 and P2), the number of which is fewer than that of the Mach-Zehnder modulator 13 of the optical transmission device 11a, in addition to the additional electrode (P0).

The optical transmission device 11c allows the driver 15 to enable three kinds of phase changes as follows: phase change caused by the signal applied to the first electrode, phase change caused by the signal applied to the second electrode, and phase change caused by the signals applied to the first and second electrodes.

Lengths of modulation electrodes (P1 and P2): (1.0 mm, 2.0 mm) The ratio of the modulation electrodes in length (P1:P2): (1:2).

Figure 10:
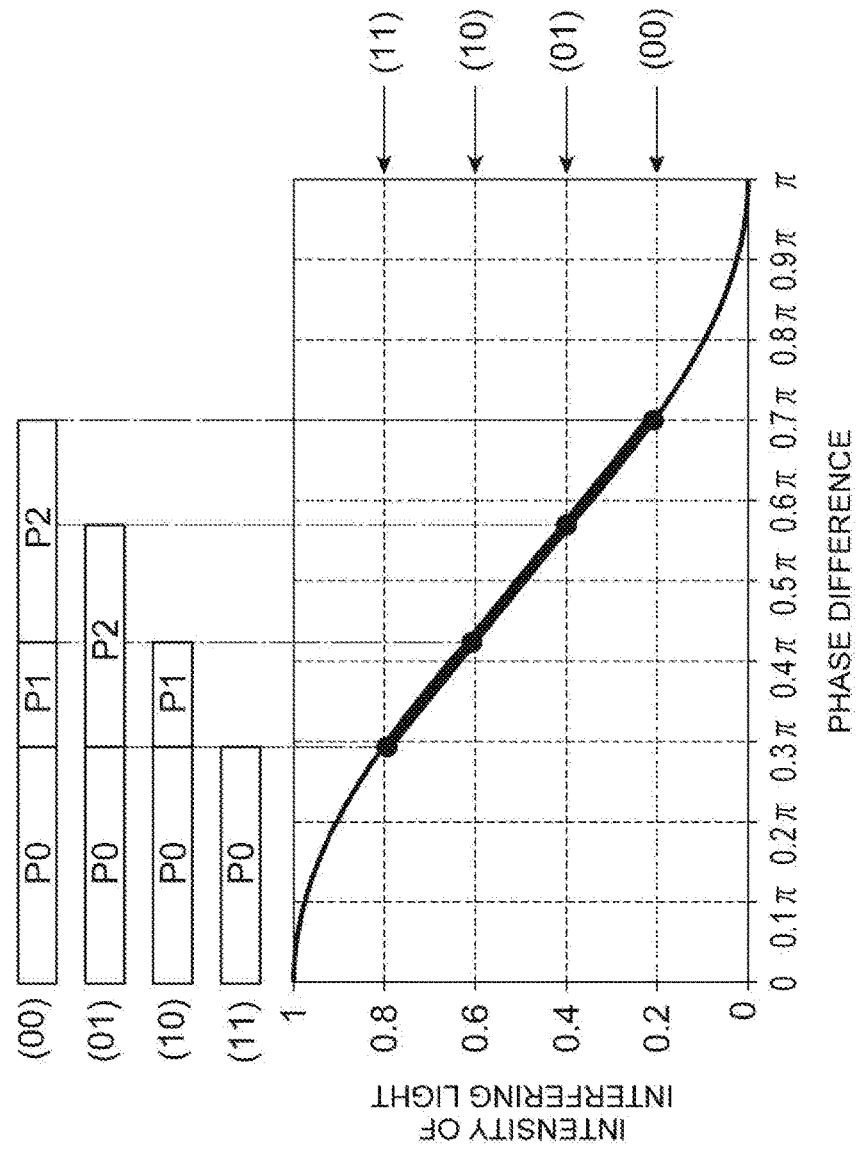
FIG. 10 is a view showing the relationship between the phase difference of two light beams in the respective arm waveguides and the intensity of interference light.

FIG. 10 is a graph showing the relationship between the intensity of the interfering light and the difference in phase between two light beams in the arm waveguides. FIG. 10 shows a characteristics curve indicating that the intensity of the interfering light of two light beams in the arm waveguides is not proportional to the phase difference between the two light beams in the full range and is substantially proportional (linear relationship) to the phase difference between the two light beams in the range of 0.2 to 0.8 in light intensity. As will be understood from the following description, combining the two modulation electrodes (P1 and P2) can associate the light intensities of 0.2, 0.4, 0.6 and 0.8 (relative intensity) with symbols (00), (01), (10) and (11), respectively. The additional electrode P0 (21d, 23d, and 31d) can tune the phase of light in the arm waveguide to generate an initial phase shift of about 0.3π independent of symbols. Using modulation electrodes (P1 and P2) can produce additional phase shifts corresponding to (00), (01), (10) and (11) in addition to the value of the initial phase shift. The optical transmission device 11c, which uses the linear region of the characteristics curve for phase modulation, makes the sum of the lengths of the modulation electrodes (P1 and P2) shorter than that of the optical transmission device 11a, so that the Mach-Zehnder modulator 13 is provided with short arm waveguides.

Generation of Symbol (00).

Regarding symbol (00), the differential signals (SM1D and SM2D) are generated such that the additional electrode (P0) and the modulation electrodes (P1 and P2) cause a phase change, and the multiplexer 13d receives light beams from the first and second arm waveguides 13a and 13b to generate an interfering output light $L_{OUT}$ having an intensity of substantially 0.2 times as large as that of the input light $L_{IN}$. This output is associated with the symbol (00).

Generation of Symbol (01).

Regarding symbol (01), the differential signals (SM1D and SM2D) are generated such that the modulation electrode (P2) and the additional electrode (P0) cause phase change and the modulation electrode (P1) causes no phase change, and the multiplexer 13d receives the light beams from the first and second arm waveguides 13a and 13b to generate an interfering output light $L_{OUT}$ having an intensity of 0.4 times as large as the input light $L_{IN}$. This output is associated with symbol (01).

Generation of Symbol (10).

Regarding symbol (10), the differential signal (SM1D and SM2D) are generated such that the modulation electrode (P1) and the additional electrode (P0) cause a phase change and the modulation electrode (P2) causes no phase change, and the multiplexer 13d receives the light beams from the first and second arm waveguides 13a and 13b to generate an interfering output light $L_{OUT}$ having the intensity of 0.6 times as large as that of the input light $L_{IN}$. This output is associated with the symbol (10).

Generation of Symbol (11).

Regarding symbol (11), the amplifiers 29 generate the differential signals (SM1D and SM2D) such that the additional electrode (P0) causes a phase change and the modulation electrodes (P1 and P2) cause no phase change, and the multiplexer 13d receives the light beams from the first and second arm waveguides 13a and 13b to generate an interfering output light $L_{OUT}$ having an intensity of 0.8 times as large as that of the input light $L_{IN}$. This output is associated with the symbol (11).

The Mach-Zehnder modulator 13 receives the input light $L_{IN}$ through the first lens LZ1. The demultiplexer 13c divides the input light $L_{IN}$ to the first and second arm waveguides 13a and 13b. In response to the phase signal from the additional electrodes P0 (21d, 23d, and 31d) and the differential signals (SM1D and SM2D) from the modulation electrodes (P1 and P2), the first and second arm waveguides 13a and 13b change the phase of the input light $L_{IN}$. The multiplexer 13d receives the light beams from the first and second arm waveguides 13a and 13b to produce interfering light (output light $L_{OUT}$) from these light beams. The output light $L_{OUT}$ is output to the second lens LZ2.

EXAMPLE 4

Figure 11:
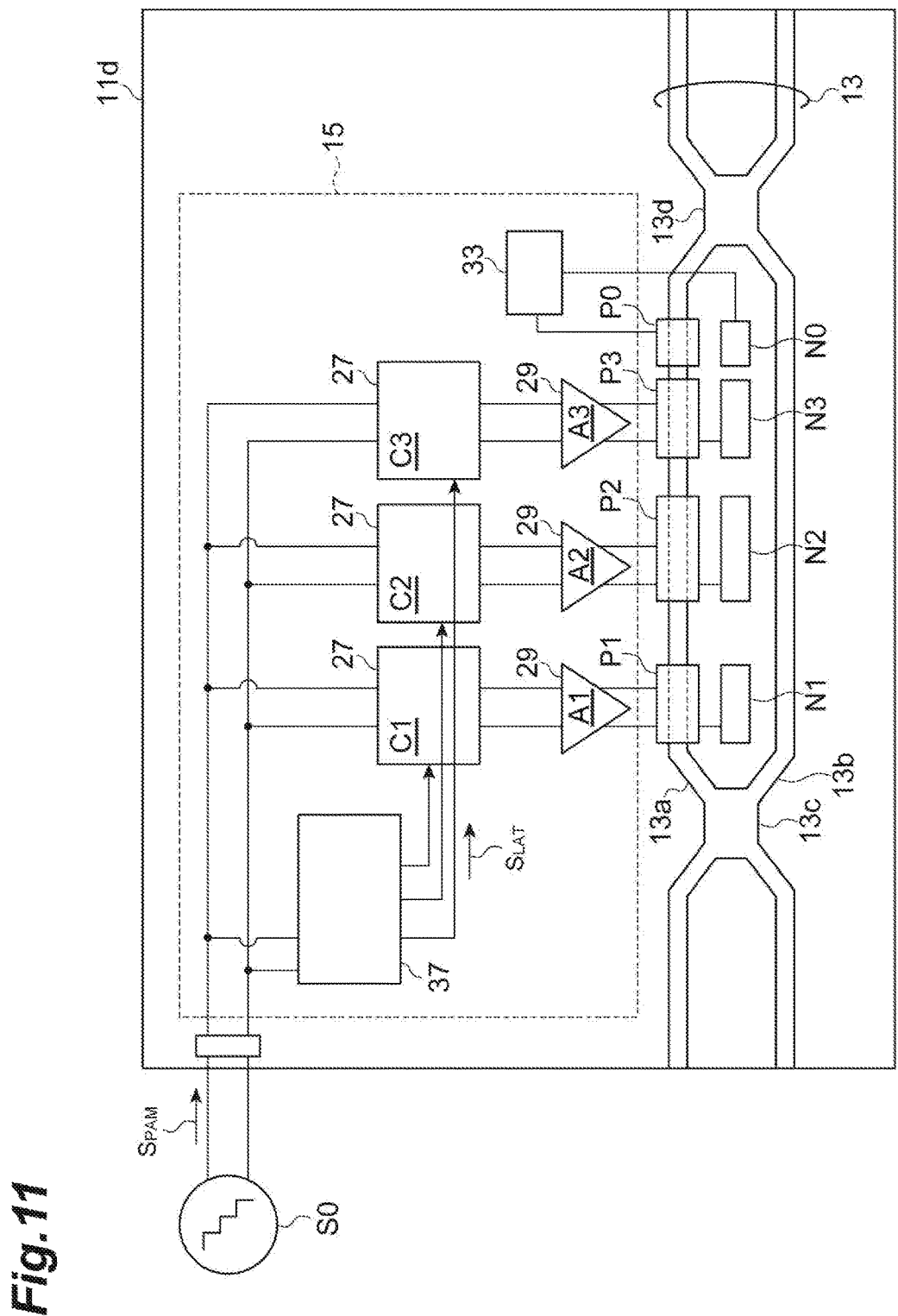
FIG. 11 is a schematic view showing an optical transmission apparatus according to a fourth embodiment.

FIG. 11 is a schematic view showing an optical transmission device 11d according to the fourth embodiment. The optical transmission apparatus 11d further includes a timing extraction circuit 37 in addition to the comparators 27 and the amplifiers 29. The timing extraction circuit 37 extracts a frequency component for the clock signal, which is contained in the pulse amplitude modulated signal, from the pulse amplitude modulated signal, and generates a timing signal from the frequency component. The comparators 27 generate respective comparison results in response to the timing signal, and hold the comparison results. More specifically, the timing extraction circuit 37 receives the PAM signal and regenerates the clock signal from the PAM signal. The regeneration of the clock signal can be provided by a circuit that enables extraction of the clock frequency from the PAM signal, for example, a clock data recovery (CDR) circuit. The timing signal is used as a latch signal $S_{LAT}$, which is generated in synchronization with the clock cycle thus extracted. Specifically, the timing extraction circuit 37 can generate the latch signal $S_{LAT}$ in synchronization with the transition timing of the PAM signal. The comparators 27 each include a latch circuit which receives the latch signal $S_{LAT}$ from the timing extraction circuit 37.

Figure 12:
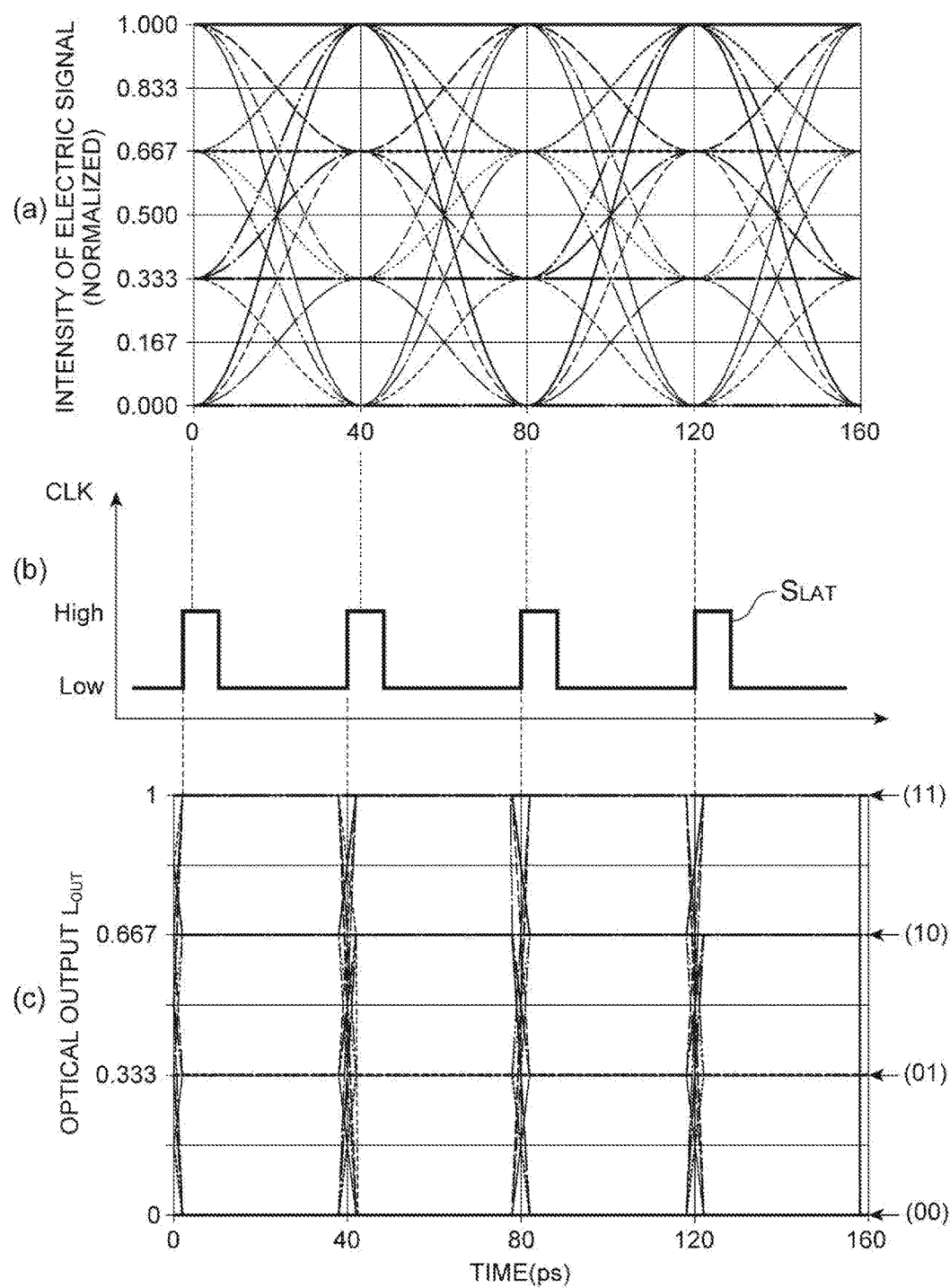
FIG. 12 is a view showing a PAM signal having a rounded waveform, a latch signal produced from the PAM signal, and an optical signal produced from the PAM signal.

As shown in part (a) of FIG. 12, a high speed PAM signal shows dull rising and falling edges because of its short period of frame. According to inventor's estimates, the PAM signal having a frame of about 40 picoseconds may generate phase jitter of about 19.2 picoseconds. Such phase jitters are eventually transferred to the phase of the optical signal.

The timing extraction circuit 37 can produce the latch signal $S_{LAT}$ shown in part (b) of FIG. 12 from the PAM signal having a blunt waveform as shown in part (a) of FIG. 12. The driver 15 operates in response to the PAM signal shown in part (a) of FIG. 12, and the first, second, and third comparison circuits C1, C2, and C3 in the comparators 27 each latch the amplitude of the PAM signal at the latch timing. The first, second and third amplifiers A1, A2, A3 in the amplifiers 29 receive, from the first, second, and third comparison circuits C1, C2, and C3, respective pulse signals that transition in synchronization with the latch timing. The first arm waveguide 13a of the Mach-Zehnder modulator 13 receives, from the amplifiers 29, drive signals (SM1D, SM2D, and SM3D) which change with reference to the transition timing in the clock cycle extracted. In the present embodiment, the second arm waveguide 13b does not receive any electric signal. As shown in part (c) of FIG. 12, symbols (11), (10), (01) and (00) correspond to relative intensities of 1.0, 0.667, 0.333, and 0, respectively.

In the present embodiment, the timing extraction circuit 37 generates a pulse-shaped latch signal of a short duration that changes from the first value (for example, Low) to the second value (for example, High) at the timing in which the eye opening becomes maximum in the waveform of the PAM electric signal. The comparators 27 compare the voltages in synchronization with the timing at which the latch signal changes from the first value (Low) to the second value (High), and then stops the comparison to in synchronous with the timing at which the latch signal returns to the first value (Low) and holds the comparison result.

The comparators 27 each generates an electric signal indicating the comparison result and maintain this electric signal for the period of time till the time at which the latch signal changes from the first value (Low) to the second value (High). The next voltage comparison is carried out in synchronization with the timing at which the next clock signal changes to the second value (High). The timing extraction circuit 37 regenerates the clock component of the received PAM signal to provide the adjusted timing at which the comparators 27 takes in the value of the PAM signal. This adjustment can prevent the waveform rounding in the received PAM signal from transferring to the optical signal. The latching comparators 27 can reshape the rounding of the waveform of the PAM signal supplied to the optical transmission apparatus. As shown in part (c) of FIG. 12, the optical transmission device 11$d$ according to the present embodiment can produce a signal light of a nearly rectangular waveform from a high-speed modulated signal of 40 picoseconds per frame.

The above embodiments can provide an optical transmission apparatus that produces a PAM optical signal from a PAM electrical signal, and a semiconductor integrated driving device that can drive a Mach-Zehnder optical modulator in response to a PAM electric signal.

Having described and illustrated the principle of the invention in a preferred embodiment thereof, it is appreciated by those having skill in the art that the invention can be modified in arrangement and detail without departing from such principles. We therefore claim all modifications and variations coming within the spirit and scope of the following claims.

What is claimed is:

1. An optical transmission apparatus comprising:
   a Mach-Zehnder modulator including a first arm waveguide having electrodes; and
   a driver driving the Mach-Zehnder modulator in response to a pulse amplitude modulated signal,
   the driver including driving circuits connected to the respective electrodes, the driving circuits including comparators receiving the pulse amplitude modulated signal and producing comparison result signals therefrom, and amplifiers directly connected with respective of the comparators, the amplifiers generating modulation signals for driving the Mach-Zehnder modulator in response to the comparisons result signals from the comparators.

2. The optical transmission apparatus according to claim 1, further comprising a timing extraction circuit receiving the pulse amplitude modulated signal, the timing extraction circuit extracting a frequency component of a clock signal from the pulse amplitude modulated signal and generating a timing signal from the frequency component, and
   the comparator producing a comparison result in response to the timing signal, and holding the comparison result.

3. The optical transmission apparatus according to claim 1, wherein
   the pulse amplitude modulated signal has four levels indicating four symbols,
   the electrodes include a first electrode and a second electrode, and
   each of the amplifiers is a limiting amplifier connected between its respective comparator and the Mach-Zehnder modulator.

4. The optical transmission apparatus according to claim 1, wherein
   the pulse amplitude modulated signal has four levels indicating four symbols,
   the electrodes include a first electrode, a second electrode, and a third electrode, and
   each of the amplifiers is limiting amplifier connected between its respective comparator and the Mach-Zehnder modulator.

5. The optical transmission apparatus according to claim 1, wherein
   the Mach-Zehnder modulator includes a second arm waveguide having electrodes, a demultiplexer connected to the first arm waveguide and the second arm waveguide, and a multiplexer connected to the first arm waveguide and the second arm waveguide,
   the driving circuits are connected to the electrodes of the second arm waveguide to the drive the second arm waveguide in response to the pulse amplitude modulate signal.

6. An optical transmission apparatus comprising:
   a Mach-Zehnder modulator including a first arm waveguide with a plurality of electrodes;
   a semiconductor integrated driving device having an input configured to receive a pulse amplitude modulated signal having amplitude levels indicating respective symbols, and a plurality of outputs configured to supply a plurality of drive signals to the Mach-Zehnder modulator, the plurality of drive signals being associated with respective amplitudes of the pulse amplitude modulated signal such that one or more of the electrodes causes a phase change in light propagating in the first arm waveguide; and
   a plurality of conductors connecting the plurality of electrodes of the first arm waveguide with the semiconductor integrated driving device,
   the semiconductor integrated driving device including a plurality of limiting amplifiers driving the plurality of electrodes,
   the plurality of limiting amplifiers being connected to the Mach-Zehnder modulator through the plurality of conductors,
   the semiconductor integrated driving device including comparators receiving the pulse amplitude modulated signal from the input and producing comparison result signals therefrom, and
   the plurality of the limiting amplifiers being in direct connection the plurality of comparators and generating the plurality of drive signals in response to the comparison results signals from the plurality of comparators.

7. A semiconductor integrated driving circuit comprising:
   an input configured to receive a pulse amplitude modulated signal having amplitude levels indicating respective symbols on an optical signal to be produced by a Mach-Zehnder modulator having a plurality of modulation electrodes;
   a plurality of driving circuits connected to the input and generating a plurality of drive signals; and a plurality of outputs connected to the plurality of driving circuits and configured to supply the plurality of drive signals to the plurality of modulation electrodes of the Mach-Zehnder modulator, the plurality of driving circuits including a plurality of comparators receiving the pulse amplitude modulated signal from the input and producing comparison result signals therefrom, and amplifiers directly connected with respective of the comparators, the amplifiers generating the drive signals for driving the Mach-Zehnder modulator in response to the comparison result signals from the comparators.

8. The optical transmission apparatus according to claim 6, further comprising a timing extraction circuit receiving the pulse amplitude modulated signal, wherein the timing extraction circuit extracts a frequency component of a clock signal from the pulse amplitude modulated signal and generates a timing signal from the frequency component, and the comparators produce comparison results in response to the timing signal.

9. The optical transmission apparatus according to claim 6, wherein the pulse amplitude modulated signal has four levels indicating four symbols, the plurality of electrodes includes a first electrode and a second electrode, and the plurality of limiting amplifiers includes a first limiting amplifier and a second limiting amplifier.

10. The optical transmission apparatus according to claim 6, wherein the pulse amplitude modulated signal has four levels indicating four symbols, the plurality of electrodes includes a first electrode, a second electrode, and a third electrode, and the plurality of limiting amplifiers includes a first limiting amplifier, a second limiting amplifier, and a third limiting amplifier.

11. The optical transmission apparatus according to claim 6, wherein the Mach-Zehnder modulator includes a second arm waveguide having electrodes, a demultiplexer connected to the first arm waveguide and the second arm waveguide, and a multiplexer connected to the first arm waveguide and the second arm waveguide, and the driving circuits are connected to the electrodes of the second arm waveguide to drive the second arm waveguide in response to the the pulse amplitude modulated signal.

12. The optical transmission apparatus according to claim 1, wherein the comparison result signals are electric pulse signals indicative of a desired period of time during which a phase change is caused in light propagating within the first arm waveguide of the Mach-Zehnder modulator.

13. The optical transmission apparatus according to claim 12, wherein each of the amplifiers includes a limiting amplifier connected to one of the electrodes.

14. The optical transmission apparatus according to claim 1, wherein each of the modulation signals has a first level causing a first phase change in light propagating in the first arm waveguide and a second level causing a second phase change in light propagating in the first arm waveguide, the second level being different from the first level in magnitude, and the first phase change being larger than the second phase change.

15. The optical transmission apparatus according to claim 14, wherein the driver, in response to a value of the pulse amplitude modulated signal, is operable to cause one of the amplifiers to drive the first arm waveguide with the first level and to cause a remainder of the amplifiers to drive the first arm waveguide with the second level, and the driver, in response to a value of the pulse amplitude modulated signal, is operable to cause two or more of the amplifiers to drive the first arm waveguide with the first level and to cause a remainder of the amplifiers to drive the first arm waveguide with the second level.

16. The optical transmission apparatus according to claim 15, wherein the driver is operable to cause all of the amplifiers to drive the first arm waveguide with the first level in response to a value of the pulse amplitude modulated signal.

17. The optical transmission apparatus according to claim 15, wherein the driver is operable to cause all of the amplifiers to drive the first arm waveguide with the second level in response to a value of the pulse amplitude modulated signal.

18. The optical transmission apparatus according to claim 14, wherein the driver is operable to drive the first arm waveguide to cause an initial phase change to light propagating therein and the amplifiers to drive the first arm waveguide with the first level or the second level in response to values of the pulse amplitude modulated signal.

19. The optical transmission apparatus according to claim 15, wherein the driver is operable to cause another of the amplifiers to drive the first arm waveguide with the first level and a remainder of the amplifiers to drive the first arm waveguide with the second level in response to a value of the pulse amplitude modulated signal.

20. The optical transmission apparatus according to claim 18, wherein the two or more of the amplifiers include the one electrode and the another electrode.

21. The optical transmission apparatus according to claim 14, wherein the second phase change is substantially zero.

22. The optical transmission apparatus according to claim 6, wherein the comparison result signals are electric pulse signals indicative of a desired period of time during which the phase change is caused in light propagating within the first arm waveguide of the Mach-Zehnder modulator.

23. The optical transmission apparatus according to claim 6, wherein each of the drive signals has a first level causing a first phase change of light propagating in the first arm waveguide and a second level causing a second phase change of light propagating in the first arm waveguide, the second level being different from the first level in magnitude, and the first phase change being larger than the second phase change.

24. The optical transmission apparatus according to claim 23, wherein the semiconductor integrated driving device, in response to a value of the pulse amplitude modulated signal, is operable to cause one of the amplifiers to drive the first arm waveguide with the first level and to cause a remainder of the amplifiers to drive the first arm waveguide with the second level, and the semiconductor integrated driving device, in response to a value of the pulse amplitude modulated signal, is operable to cause two or more of the amplifiers to drive the first arm waveguide with the first level and to cause a remainder of the amplifiers to drive the first arm waveguide with the second level.

25. The optical transmission apparatus according to claim 24, wherein
the semiconductor integrated driving device is operable to cause all of the amplifiers to drive the first arm waveguide with the first level in response to a value of the pulse amplitude modulated signal.

26. The optical transmission apparatus according to claim 24, wherein
the semiconductor integrated driving device is operable to cause all of the amplifiers to drive the first arm waveguide with the second level in response to a value of the pulse amplitude modulated signal.

27. The optical transmission apparatus according to claim 23, Wherein
the semiconductor integrated driving device is operable to drive the first arm waveguide to cause an initial phase change to light propagating therein and the amplifiers to drive the first arm waveguide with the first level or the second level in response to values of the pulse amplitude modulated signal.

28. The semiconductor integrated driving circuit according to claim 7, wherein the comparison result signals are electric pulse signals indicative of a desired period of time during which a phase change is caused in light propagating within an arm waveguide of the Mach-Zehrider modulator.

29. The optical transmission apparatus according to claim 7, wherein
each of the drive signals has a first level causing a first phase change of light propagating in the arm waveguide and a second level causing a second phase change of light propagating in the arm waveguide, the second level being different from the first level in magnitude, and the first phase change being larger than the second phase change.

30. The optical transmission apparatus according to claim 29, wherein
the driving circuits, in response to a value of the pulse amplitude modulated signal, are operable to cause one of the amplifiers to drive the arm waveguide with the first level and to cause a remainder of the amplifiers to drive the arm waveguide with the second level, and
the driving circuits, in response to a value of the pulse amplitude modulated signal, are operable to cause two or more of the amplifiers to drive the arm waveguide with the first level and a remainder of the amplifiers to drive the arm waveguide with the second level.

31. The optical transmission apparatus according to claim 30, wherein
the driving circuits are operable to cause all of the amplifiers to drive the arm waveguide with the first level in response to a value of the pulse amplitude modulated signal.

32. The optical transmission apparatus according to claim 30, wherein
the driving circuits are operable to cause all of the amplifiers to drive the arm waveguide with the second level in response to a value of the pulse amplitude modulated signal.

33. The optical transmission apparatus according to claim 29, wherein
the driving circuits are operable to drive the arm waveguide to cause an initial phase change to light propagating therein and the amplifiers to drive the arm waveguide with the first level or the second level in response to values of the pulse amplitude modulated signal.

* * * * *